US009522351B2

(12) United States Patent
Lescoche (10) Patent No.: US 9,522,351 B2
(45) Date of Patent: Dec. 20, 2016

(54) SHAPE OF FILTERING ELEMENTS (75) Inventor: Philippe Lescoche, Piegon (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 695 days.

(21) Appl. No.: 13/978,899

(22) PCT Filed: Jan. 12, 2012

(86) PCT No.: PCT/FR2012/050078
§ 371 (c)(1),
(2), (4) Date: Sep. 26, 2013

(87) PCT Pub. No.: WO2012/095611
PCT Pub. Date: Jul. 19, 2012

(65) Prior Publication Data
US 2014/0021127 A1 Jan. 23, 2014

(30) Foreign Application Priority Data
Jan. 13, 2011 (FR) ...................... 11 50277

(51) Int. Cl.
*B01D 29/00* (2006.01)
*B01D 63/06* (2006.01)
(Continued)

(52) U.S. Cl.
CPC ......... *B01D 29/009* (2013.01); *B01D 29/0056* (2013.01); *B01D 29/035* (2013.01);
(Continued)

(58) Field of Classification Search
CPC ....... B01D 29/009; B01D 29/01; B01D 29/03; B01D 29/44; B01D 29/0043; B01D 29/23; B01D 29/35; B01D 29/52; B01D 17/02; B01D 17/0202; B01D 46/2451; B01D 46/2455; B01D 46/2466; B01D 46/247; B01D 46/2474; B01D 63/06; B01D 63/066; B01D 63/08; B01D 69/04; B01D 69/046; B01D 2046/2496; B01D 2046/2488; B01D 2313/146; B01D 29/0054; B01D 29/0056; B01D 29/0059; B01D 29/035; B01D 2319/02; B01D 2319/025; B01D 2319/04; B01D 2325/08
(Continued)

(56) References Cited

U.S. PATENT DOCUMENTS 5,454,947 A * 10/1995 Olapinski ............... B01D 29/35
210/500.26
5,641,332 A * 6/1997 Faber ................... B01D 46/005
210/321.89
(Continued)

FOREIGN PATENT DOCUMENTS

DE 4134223 11/1992
EP 0778073 6/1997
(Continued)

*Primary Examiner* — Joseph Drodge
(74) *Attorney, Agent, or Firm* — Clark & Brody (57) ABSTRACT A filtration element for filtering a fluid medium comprising a rigid porous support of cylindrical shape having a longitudinal central axis (A) and comprising a plurality of channels for the circulation of the fluid medium to be filtered with a view to recovering a filtrate at the periphery of the support. The channels are parallel to a central axis of the support. The channels have at least three filtration crowns, characterized in that at the three crowns closest to the periphery of the support there is at least a substantial alignment of 3 adjacent axes among the axes of the flow and connection paths and the axes of the channels, which favors the mechanical strength of the support.

25 Claims, 6 Drawing Sheets (51) Int. Cl.
    *B01D 69/04*    (2006.01)
    *B01D 29/03*    (2006.01)
(52) U.S. Cl.
    CPC ...... *B01D 63/066* (2013.01); *B01D 2313/146* (2013.01); *B01D 2319/025* (2013.01)
(58) Field of Classification Search
    USPC ...... 210/321.75, 321.8, 321.84, 321.89, 483, 210/489, 490, 495, 510.1, 500.22, 210/500.25, 500.26; 55/482, 483, 490, 55/523; 96/4, 7, 9, 96/11
    See application file for complete search history.

(56) References Cited

U.S. PATENT DOCUMENTS

| | | | | |
|---|---|---|---|---|
| 5,853,582 A | * | 12/1998 | Grangeon et al. | B01D 29/15 210/321.89 |
| 5,853,852 A | * | 12/1998 | Eichhorn | B44C 5/0407 156/101 |
| 7,384,549 B2 | * | 6/2008 | de los Reyes | B01D 61/14 210/321.72 |
| 2003/0155290 A1 | * | 8/2003 | Chanaud | B01D 45/12 210/321.6 |

FOREIGN PATENT DOCUMENTS

| | | |
|---|---|---|
| EP | 0778074 | 6/1997 |
| EP | 0780148 | 6/1997 |
| FR | 2741821 | 6/1997 |
| FR | 2785831 | 5/2000 |
| FR | 2898513 | 9/2007 |
| WO | 93/07959 | 4/1993 |
| WO | 00/29098 | 5/2000 |
| WO | 01/62370 | 8/2001 |

\* cited by examiner

SHAPE OF FILTERING ELEMENTS

The present invention relates to the technical field of tangential separation using filtration elements suitable for ensuring the separation of the molecules or of the particles contained in a fluid medium to be treated. The subject of the invention targets, more specifically, new filtration elements comprising a rigid porous support in which circulation channels for the fluid to be filtered are arranged, said support having an original geometry.

The subject of the invention finds a particularly advantageous application in the field of filtration in the broad sense, and especially nanofiltration, ultrafiltration, microfiltration or reverse osmosis.

In the prior art, many filtration elements are known that are produced from a support of tubular or flat nature. Filtration elements of tubular type comprising a porous support, for example made of an inorganic material, for example made of ceramic, in which a series of channels is arranged, have in particular been proposed. This support may be combined with one or more separating layers, for example made of an inorganic material, deposited on the surface of each circulation channel and connected to one another and to the support by sintering. These layers make it possible to adjust the filtration power of the filtration element.

In the field of tubular filtration elements, the rigid porous support is of elongated shape and has a transverse cross section that is usually polygonal or circular. Many supports comprising a plurality of channels parallel to one another and to the longitudinal axis of the porous support have already been proposed, in particular, by the applicant. For example, filtration elements comprising a series of non-circular channels are described in patent application WO 93 07959 in the name of CERASIV, patent application EP 0 780 148 in the name of CORNING, patent application WO 00/29098 in the name of ORELIS, patents EP 0 778 073 and EP 0 778 074 in the name of the applicant and patent applications WO 01/62370 in the name of Société des Céramiques Techniques and FR 2898513 in the name of ORELIS. In operation, the channels communicate, on the one hand, with an inlet chamber for the fluid medium to be treated and, on the other hand, with an outlet chamber. The surface of the channels is, usually, covered with at least one separating layer that ensures the separation of the molecules or of the particles contained in the fluid medium circulating inside the channels, in a given direction, from one end of the channels known as the inlet end to the other end known as the outlet end. Such a filtration element produces, via a screening effect, a separation of the molecular or particulate species of the product to be treated, insofar as all the particles or molecules greater than the diameter of the pores of the zone of the filtration element with which they are in contact are stopped. During the separation, the transfer of the fluid takes place across the support and optionally the separating layer or layers when they are present, and the fluid spreads into the porosity of the support in order to be sent to the outer surface of the porous support. The portion of the fluid to be treated that has crossed the separating layer and the porous support is referred to as the permeate or filtrate and is recovered by a collection chamber surrounding the filtration element.

With a view to increasing the surface area of the channels enabling the filtration of the fluid, it is often sought to have a large number of channels within one and the same support. Due to the large number of channels, the number of possible arrangements of the channels with respect to one another is large. Within this context, the applicant, concerned with offering new filtration elements, proposes, within the context of the present invention, a new support geometry.

The present invention relates to a filtration element for filtering a fluid medium comprising a rigid porous support of cylindrical shape having a longitudinal central axis and comprising a plurality of channels for the circulation of the fluid medium to be filtered with a view to recovering a filtrate at the periphery of the support, which channels are made in the support parallel to its central axis, the total surface area of the transverse cross sections of all of the channels made in the support representing at least 42% of the total surface area of the transverse cross section of the support and said channels defining, in particular, filtration crowns, of at least three in number, in each of which:
- the channels have a noncircular transverse cross section, the transverse cross section of each channel having an axis of symmetry that passes through the center of the support,
- two neighboring channels are separated by flow and connection paths, said flow and connection paths having an axis of symmetry that passes through the center of the support,
- the ratios between any two hydraulic diameters of channels belonging to the filtration crowns are all within the interval 0.75-1.25, preferably within the interval 0.95-1.05.

Furthermore, the filtration crowns are distributed concentrically and separated from one another by a continuous porous zone, without overlap between two adjacent crowns. Moreover, if the filtration element according to the invention has more than three filtration crowns, there is at least one crown among the three crowns closest to the periphery of the support, known as row n, n−1 and n−2 crowns, the number of channels of which is not a multiple of the number of channels of the crown closest to the center of the support, known as row 1 crown.

According to one essential feature, at the three crowns closest to the periphery of the support, known as row n, n−1 and n−2 crowns, there is at least a substantial alignment of 3 adjacent axes among the axes of the flow and connection paths and the axes of the channels, which favors the mechanical strength of the support. In other words, in the crown n there is an axis of a flow and connection path or an axis of a channel which is substantially aligned with an axis of a flow and connection path or an axis of a channel of the n−1 crown, which is itself substantially aligned with an axis of a flow and connection path or an axis of a channel of the n−2 crown, these three substantially aligned axes being located on the same side with respect to the center A of the support and are referred to as adjacent.

Such filtration elements which have a high transparency are highly advantageous for their filtering capacity.

Furthermore, within the context of the invention, the applicant evaluated the existing stress fields within supports comprising a series of at least 3 crowns of channels and demonstrated that the maximum stress was at the crowns closest to the periphery of the support. The applicant proposes to select particular positionings of the three crowns closest to the periphery of the support, with a view to improving the mechanical performances of the filtration element.

According to a first embodiment, the substantial alignment between the axes of the flow and connection paths and the axes of the channels which favors the mechanical strength of the support corresponds to the fact that at least one axis of a flow and connection path of the crown closest to the periphery of the support, known as row n crown, is substantially aligned with the axis of an adjacent channel of the crown of lower row n−1, said axis of the channel itself being substantially aligned with the axis of an adjacent flow and connection path of the crown of lower row n−2.

According to a second embodiment, the substantial alignment between the axes of the flow and connection paths and the axes of the channels, which favors the mechanical strength of the support, corresponds to the fact that at least one axis of a channel of the crown closest to the periphery of the support, known as row n crown, is substantially aligned with the axis of an adjacent flow and connection path of the crown of lower row n−1, said axis of the flow and connection path being itself substantially aligned with the axis of an adjacent channel of the crown of lower row n−2.

The two embodiments above may also be combined together.

According to one embodiment that can be combined with the preceding embodiments, at least one axis of a flow and connection path of the crown closest to the periphery of the support, known as row n crown, is substantially aligned with the axis of an adjacent flow and connection path of the crown of lower row n−1, said axis of the flow and connection path of the row n−1 crown being itself substantially aligned with the axis of an adjacent flow and connection path of the crown of lower row n−2.

According to one embodiment that can be combined with the preceding embodiments, at least one axis of a channel of the crown closest to the periphery of the support, known as row n crown, is substantially aligned with the axis of an adjacent channel of the crown of lower row n−1, said axis of the channel of the row n−1 crown being itself substantially aligned with the axis of an adjacent channel of the crown of lower row n−2.

What is meant by "substantially aligned", in each of the above cases, will be defined in the remainder of the description. Generally, this means that a certain tolerance in the alignment may be granted, without however making the mechanical characteristics of the filtration element fall too considerably. For example, the axes X and Y ($X_n$ and $Y_{n-1}$ and $Y_{n-1}$ and $X_{n-2}$ or $Y_n$ and $X_{n-1}$ and $X_{n-1}$ and $Y_{n-2}$) which are substantially aligned in accordance with the invention are perfectly merged or form an angle of less than or equal to 3°, and preferably less than 2° and preferentially less than 1°. In all the cases presented in the description, the perfect alignment of the axes envisaged corresponds to the particularly preferred configuration.

A channel or path of a crown of row i and the path or channel which is closest thereto in the neighboring crown of row i+1 or i−1 are referred to as adjacent.

According to particular embodiments that can be combined with the preceding embodiments which will be explained in detail in the description which follows, the filtration elements according to the invention may have one or other of the features below or any combination of these features, or even all of these features, when they do not exclude one another:

on the one hand, the axis of a flow and connection path of the crown closest to the periphery of the support, known as row n crown, is aligned with the axis of an adjacent channel of the crown of lower row n−1, with a tolerance of ±16% and, preferably, of ±10%, of the value of the angular sector defined by the two axes of symmetry of the flow and connection paths delimiting said channel of the row n−1 crown and, on the other hand, said axis of the channel is itself substantially aligned with the axis of an adjacent flow and connection path of the crown of lower row n−2, with a tolerance of ±16% and, preferably, of ±10%, of the value of the angular sector defined by the two axes of symmetry of the flow and connection paths delimiting said channel of the row n−1 crown;

on the one hand, the axis of a channel of the crown closest to the periphery of the support, known as row n crown, is aligned with the axis of an adjacent flow and connection path of the crown of lower row n−1, with a tolerance of ±16% and, preferably, of ±10%, and preferentially of ±5%, of the value of the angular sector defined by the two axes of symmetry of the flow and connection paths delimiting said channel of the row n crown and, on the other hand, said axis of the flow and connection path is itself substantially aligned with the axis of an adjacent channel of the crown of lower row n−2, with a tolerance of ±16% and, preferably, of ±10%, and preferentially of ±5%, of the value of the angular sector defined by the two axes of symmetry of the flow and connection paths delimiting said channel of the row n−2 crown;

on the one hand, an axis of a channel of the crown closest to the periphery of the support, known as row n crown, is aligned with the axis of an adjacent channel of the crown of lower row n−1, with a tolerance of ±16% and, preferably, of ±10%, and preferentially of ±5%, of the value of the angular sector defined by the two axes of symmetry of the flow and connection paths delimiting said channel of the row n−1 crown, and, on the other hand, said axis of the channel of the crown of lower row n−1 itself being substantially aligned with the axis of an adjacent channel of the crown of lower row n−2, with a tolerance of ±16% and, preferably, of ±10%, of the value of the angular sector defined by the two axes of symmetry of the flow and connection paths delimiting said channel of the row n−1 crown;

on the one hand, the axis of a flow and connection path of the crown closest to the periphery of the support, known as row n crown, is aligned with the axis of an adjacent channel of the crown of lower row n−1, with a tolerance of ±16% and, preferably, of ±10%, and preferentially of ±5%, of the value of the angular sector defined by the two axes of symmetry of the flow and connection paths delimiting said channel of the row n−1 crown and, on the other hand, said axis of the channel is itself substantially aligned with the axis of an adjacent flow and connection path of the crown of lower row n−2, with a tolerance of ±16% and, preferably, of ±10%, and preferentially of ±5%, of the value of the angular sector defined by the two axes of symmetry of the flow and connection paths delimiting said channel of the row n−1 crown;

on the one hand, the axis of a flow and connection path of the crown closest to the periphery of the support, known as row n crown, is aligned with the axis of an adjacent flow and connection path of the crown of lower row n−1, with a tolerance of ±3° and, preferably, of ±2°, and preferentially of ±1°, on the other hand, said axis of the flow and connection path of the row n−1 crown is itself substantially aligned with the axis of an adjacent flow and connection path of the crown of lower row n−2, with a tolerance of ±3° and, preferably, of ±2°, and preferentially of ±1°;

the number of channels per crown is increasing from the row n−2 to n crowns. This makes it possible in particular to have, in these last three crowns, an even lower variability of the hydraulic diameter of the channels from one crown to the next. Usually, the number of channels in each of these crowns will be greater than or equal to 4 and will increase by at least 2 channels per higher row;

the ratios between any two transverse cross-sectional surface areas of channels belonging to the filtration crowns are all within the interval 0.75-1.25, preferably within the interval 0.95-1.05;

the row n, n−1 and n−2 crowns each have a number of channels that is a multiple of an integer m and the number of axes of a flow and connection path of the row n crown, which are substantially aligned with the axis of an adjacent channel of the crown of lower row n−1, with said axis of the channel itself substantially aligned with the axis of an adjacent flow and connection path of the crown of lower row n−2, corresponds to this integer m. Such a configuration offers a very good burst strength of the filtration element;

the channels of one and the same filtration crown are all identical and preferably are spaced an equal distance apart from one another. They are also preferably oriented in the same manner with respect to the center of the support. Thus, the stresses exerted on the channels of one and the same crown are more uniform;

the widths of the flow dividers are equal within one and the same crown and are equal from one crown to the next;

the width of each flow divider is constant over its entire length;

the filtration element comprises a central channel, preferably of circular shape, and the filtration crowns are distributed concentrically with respect to the central channel; conventionally, the expression "central channel" means a channel having a transverse cross section that passes through the central axis of the support and is centered about said axis;

the filtration crowns are distributed over concentric circles;

all the channels of the filtration crowns have a trapezoidal or triangular cross section;

all the channels of the filtration crowns are, in particular, delimited by two side walls, an outer wall, fillets and optionally an inner wall, the fillets each having an arc-shaped profile, the radius of which is preferably greater than or equal to 0.3 mm, and preferably belongs to the range extending from 0.3 to 1.5 mm;

the filtration element comprises at least four filtration crowns and where an axis of a flow and connection path of the row n crown is substantially aligned with the axis of an adjacent channel of the crown of lower row n−1, with said axis of the channel itself substantially aligned with the axis of an adjacent flow and connection path of the crown of lower row n−2, there is also substantial alignment between said axis of the flow and connection path of the row n−2 crown and the axis of the adjacent flow and connection path of the row n−3 crown;

the support has a circular or polygonal cross section;

the mean thickness of the porous zone closest to the central axis is less than the mean thickness of the porous zone closest to the periphery of the support and on moving from the central axis of the support toward its periphery, the mean thickness of a porous zone is either identical to the next zone, or smaller;

the surface of the channels is covered with at least one inorganic filtration layer.

Another subject of the present invention is the filtration installations or modules comprising a filtration element, in accordance with the invention, in a housing.

Various other features will emerge from the description given below with reference to the appended drawings which show, as nonlimiting examples, embodiments of the supports according to invention.

The transverse cross section of a filtration element corresponds to its cross section taken perpendicular to its central axis. Generally, the structure and the dimensions of the transverse cross section are constant over the entire length of the filtration element and the geometry over this cross section is therefore representative of the geometry of the multichannel filtration element which has a symmetry of extrusion. Throughout the description, the concepts of angle, thickness, cross section and displacement within the support are understood to mean in the plane of a transverse cross section of the support. Regarding a transverse cross section of the support, mention will be made equally of the axis of the support and the center of the support.

As emerges from the various FIGS. 1A, 2, 3A and 3B, the inorganic filtration element I has a shape suitable for ensuring the separation or filtration of molecules or particles contained in a fluid medium, preferably a liquid medium, of varied nature that may or may not comprise a solid phase. The filtration element I comprises a rigid porous support 1 consisting of a material having a transfer resistance that is suitable for the separation to be carried out. In particular, the support 1 is made from one or more inorganic materials, such as metal oxides (titanium dioxide, alumina or zirconia in particular), carbon, carbide or nitride of silicon or metals. The support I is made in an elongated shape or in the form of a pipe that extends along a longitudinal central axis A. The porous support 1 generally has a mean hydraulic pore diameter between 2 and 12 μm. The support 1 has a transverse cross section which may be of various shapes, for example hexagonal or, as in the embodiments illustrated in the figures, circular. The support 1 thus has a cylindrical outer surface $1_1$.

The support 1 is arranged in order to comprise a plurality of channels $C_{01}, C_{11}, C_{12} \ldots, C_{21}, C_{22} \ldots, C_{n1}, C_{n2} \ldots$ (generically referred to as $C_{ij}$) made parallel to the longitudinal axis A of the support. The channels are distributed in a filtration zone of row i, it being possible for each filtration zone to comprise one or more channels and to be separated by a porous zone. Thus, each porous zone Z is between two filtration zones, each filtration zone comprising a channel or a plurality of channels, when it is a question of a filtration crown. The channels $C_{ij}$ each have a surface 2 that may be covered with at least one separating layer, not represented, intended to be in contact with the fluid medium to be treated circulating within the channels. The nature of the separating layer or layers is chosen as a function of the separating or filtration power to be obtained and forms, with the support, an intimate connection, so that the pressure originating from the liquid medium is transmitted to the porous support 1. This or these layers may be deposited from, for example, suspensions containing at least one metal oxide of the titanium dioxide, alumina or zirconia type in particular, optionally as a mixture, and that are conventionally used in the production of mineral filtration elements. This or these layers are subjected, after drying, to a sintering operation which makes it possible to consolidate them and to connect them to one another and also to the porous support 1.

In accordance with the invention, the support 1 comprises at least three filtration crowns $F_1, F_2, \ldots F_n$ (generically referred to as $F_i$) which are distributed concentrically. Two adjacent (i.e. successive or neighboring) filtration crowns are separated by a continuous porous zone. A porous zone Z is therefore inserted between two neighboring filtration crowns F. The porous zones, which are zones of porous material in which the filtrate circulates, are described as continuous since there is a clear delimitation between two adjacent filtration crowns, i.e. there is no overlap, nor intersection between two adjacent filtration crowns. In other words, a channel of a filtration crown cannot be found, even only partly, between two channels of an adjacent filtration crown.

Each crown constitutes a filtration zone and may be defined as a set of channels located over a closed curve, i.e. the barycenters of these channels are located over this curve. In the examples illustrated, the channels of one and the same crown are located over a circle.

Within each crown, the channels have noncircular cross sections. In the examples illustrated, the channels of the crowns are of trapezoidal shape. More generally, the channels of the filtration crowns define sectors of these filtration crowns, the shape of which is suitable for the filtration and mechanical strength requirements. These channels have one wall that faces the periphery $1_1$ of the support (referred to as outer wall), one wall facing the center A of the support (referred to as inner wall), and two side walls R connecting the inner wall and the outer wall. Usually, the side walls are connected to the inner and outer walls by fillets. In certain cases, the inner wall could be replaced by a fillet connecting the two side walls R. The endpoints of a wall are the points located at these two ends, just before the fillets. For each side wall, a direction d is defined which connects these two endpoints. Within the context of the invention, this direction d heads toward the center of the support and the side walls R will also be referred to as radial walls. Nevertheless, this direction d does not necessarily pass through the center of the support. But the directions d of the two radial walls R of one and the same channel intersect at a point located around the center of the support, with respect to said channel, and in particular at a point D located between said channel and the center of the support, as in the example illustrated in FIG. 1A. According to the variants illustrated in the figures, the radial walls R that participate in the definition of the contour of a channel correspond to two straight sides and the direction d is therefore merged with these sides. Furthermore, two channels of one and the same crown are said to be neighboring if they have a flow and connection path P in common. This flow and connection path P therefore constitutes a divider separating two neighboring channels of one and the same crown.

For the remainder of the description, it is considered that the filtration crowns and the porous zones occupy different rows which increase in the direction of the periphery of the support. Thus, for two filtration crowns (or porous zones) considered, the filtration crown (or respectively the porous zone) closest to the periphery is considered to be of a higher row relative to a filtration crown (or respectively a porous zone) closer to the center and considered to be a filtration crown (or respectively a porous zone) of a lower row. Thus, a crown of given row is surrounded by the crown or crowns of higher row.

Figure 1A:
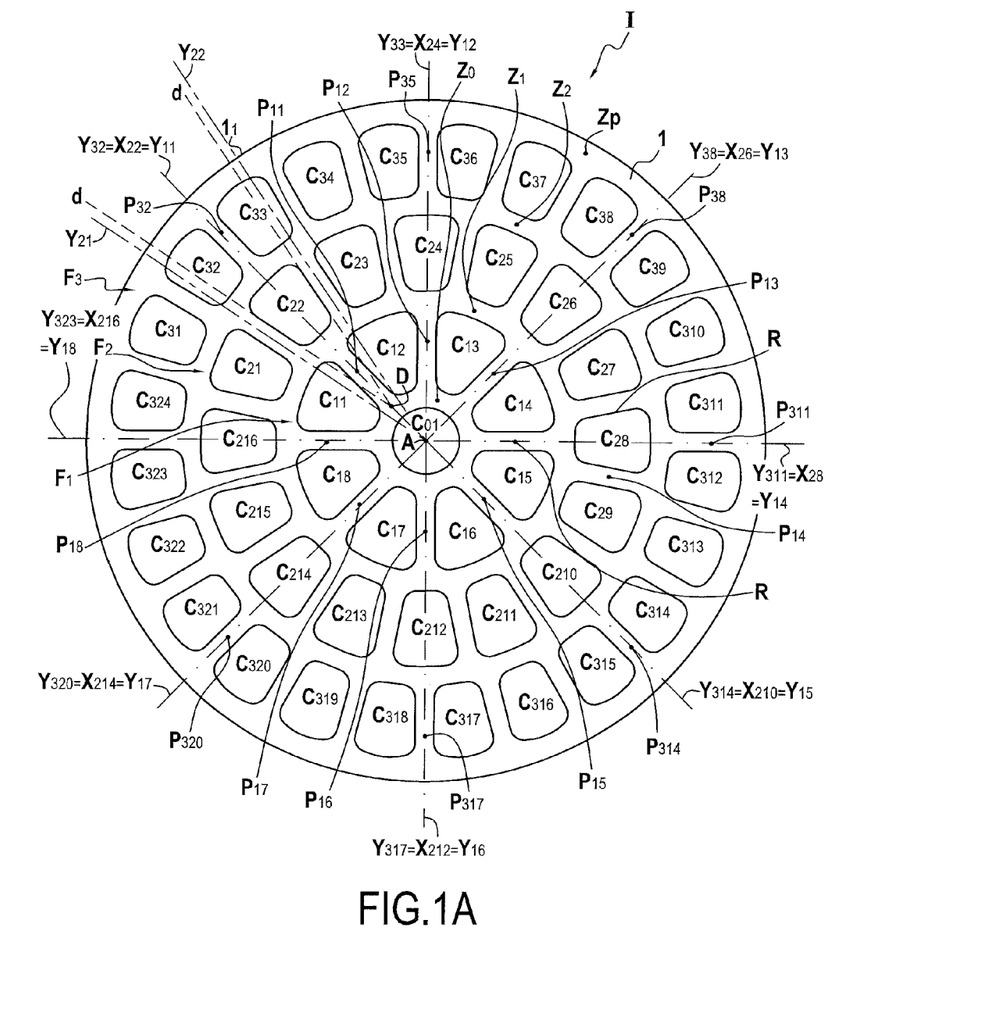
FIG. 1A is a cross-sectional view, deliberately on a larger scale, of an exemplary embodiment of a filtration element in accordance with the invention.

In the example illustrated in FIG. 1A, the support comprises three filtration crowns $F_1$ to $F_3$ and a central channel $C_{01}$, which makes it possible in particular to avoid an accumulation of material at the center of the support. In the example illustrated, the central channel $C_{01}$ is of circular shape, but a shape of polygonal or other type could also be provided. On the other hand, each filtration crown is composed of a series of noncircular channels. The central channel is separated from the filtration crown of row 1, by a porous zone $Z_0$. The filtration crowns $F_1$ and $F_2$ are separated by a porous zone $Z_1$ and the filtration crowns $F_2$ and $F_3$ are separated by a porous zone $Z_2$. In each filtration crown, the channels are separated by flow dividers for the filtrate, generically referred to as P and $P_1$ in the row 1 crown, $P_2$ in the row 2 crown and $P_3$ in the row 3 crown. These flow dividers $P_1$, $P_2$ and $P_3$ enable the filtrate to travel inside the support from one porous zone to the next, up to the peripheral zone Zp, which is also porous, in order to emerge on the outer surface $1_1$ of the support 1. In the example illustrated in FIG. 1A, the channels of the crown $F_3$, closest to the periphery of the support, have an arch-shaped profile as described in patent FR2741821 in the name of the applicant. But provision could just as well be made for the width of the zone Zp located between the outer wall of a channel of the crown $F_3$ and the periphery $1_1$ of the support to be constant.

In order to facilitate the transport of the filtrate, said flow and connection paths $P_1$, $P_2$ and $P_3$ have an axis of symmetry, which passes through the center A of the support. These axes of symmetry are referred to generically as Y and $Y_1$ in the row 1 crown, $Y_2$ in the row 2 crown and $Y_3$ in the row 3 crown. The paths P and the axes of symmetry Y are assigned subscript values in the following manner: within a row i crown, the flow and connection path located between the channels $C_{ij}$ and $C_{i(j+i)}$ is referred to as $P_{ij}$ and its axis of symmetry is $Y_{ij}$.

The various channels of the filtration crowns also have an axis of symmetry generically referred to as X which passes through the center of the support, with a view to optimizing the filtering surface area. These axes of symmetry are generically referred to as $X_1$ in the row 1 crown, $X_2$ in the row 2 crown and $X_3$ in the row 3 crown and, according to a more specific naming, they bear the same subscript values as the channel of which they are the axis.

These filtration crowns $F_1$ to $F_3$ are distributed as follows on moving from the central axis A toward the periphery $1_1$ of the support:

the row 1 filtration crown $F_1$ consists of 8 identical channels $C_{11}$ to $C_{18}$ of trapezoidal shape, the row 2 filtration crown $F_2$ consists of 16 identical channels $C_{21}$ to $C_{216}$ of trapezoidal shape, the row 3 filtration crown $F_3$ consists of a crown of 24 identical channels $C_{31}$ to $C_{324}$ of trapezoidal shape.

The number of channels present in each filtration crown therefore increases on moving from the center toward the periphery of the support.

The channels of one and the same crown are described as identical, given that they have in particular the same shape, the same cross section and the same hydraulic diameter to within small variations due to the manufacturing process. According to a precise embodiment, the outer diameter of the support could be 41 mm, and the mean hydraulic diameters (corresponding to the arithmetic mean of all the hydraulic diameters of the channels of a crown) over the crowns of rows 1, 2 and 3, could be 4.00-4.04-4.00 respectively and 4.00 mm for the central channel $C_{01}$. There is therefore also a small variability of the hydraulic diameters from one crown to the next. The same is true for the transverse cross-sectional surface areas. The mean transverse cross-sectional surface areas (corresponding to the arithmetic mean of all the transverse cross-sectional surface areas of the channels of a crown) over the crowns of rows 1, 2 and 3, are 14.7-14.5-13.8 respectively and 12.5 mm² for the central channel $C_{01}$.

The filtration crowns $F_1$ to $F_3$ are distributed concentrically with respect to the central channel $C_{01}$. The barycenters of the channels $C_{11}$, $C_{12}$ ... $C_{18}$ of the row 1 crown $F_1$ are located over a circle coaxial to the central axis A, this coaxial circle having a smaller diameter with respect to the coaxial circle over which the barycenters of the channels $C_{21}$, $C_{22}$ ... $C_{216}$ of the row 2 filtration crown $F_2$ are located and so on.

According to one essential feature of the invention, in the embodiment presented in FIG. 1A, at least one axis $Y_3$ of a flow and connection path $P_3$ of the row 3 crown $F_3$ closest to the periphery $1_1$ of the support 1 is substantially aligned with the axis $X_2$ of an adjacent channel of the crown $F_2$ of lower row 2, said axis $X_2$ of the channel itself being substantially aligned with the axis $Y_1$ of an adjacent flow and connection path $P_1$ of the crown of lower row 1. Within the context of the invention, it is considered that the axis Y of a flow path P is substantially aligned with the axis of symmetry X of a channel, when the two axes are merged or form an angle having an angular value of less than ±16% and, preferably, of less than ±10%, and in particular of less than ±5%, of the value of the angular sector defined by the two axes of symmetry of the flow and connection paths delimiting said channel. The angular sector defined by two neighboring axes Y corresponds, for example, to an angle of 5° to 60°. In particular, the two axes $X_{n-1}$ and $Y_n$ on the one hand and $Y_{n-2}$ and $X_{n-1}$ on the other hand which are substantially aligned in accordance with the invention are perfectly merged or form an angle of less than or equal to 3°, and preferably less than 2° and preferentially less than 1°. According to one preferred variant, $Y_n$, $X_{n-1}$ and $Y_{n-2}$ are perfectly aligned. The double alignment in accordance with the invention allows the filtration element to withstand high operating pressures. Indeed, the applicant observed that the maximum stresses located in the zone where the flow and connection path $P_3$ emerges from the row 3 crown level with the middle of the outer wall of the channel of the row 2 crown, were compensated for by the fact that the flow and connection path $P_1$ of the crown $F_1$ of row 1 emerged substantially in the middle of the inner wall of this same channel of the row 2 crown.

In FIG. 1A, given that in one and the same crown and therefore in particular over the crown $F_2$, all the channels are identical and regularly spaced apart from one another, the angular sectors defined by two axes of symmetry $Y_2$ (for example $Y_{21}$ and $Y_{22}$) of the flow paths $P_2$ surrounding a channel of the row 2 crown are all equal. In the example illustrated, these angular sectors are equal to 15°. Furthermore, in FIG. 1A, an exact double superimposition of axes in accordance with the invention is observed, on 8 occasions, over a transverse cross section of the support. The number of channels present over each of the crowns $F_1$ to $F_3$ is a multiple of this number 8. There is strict alignment:

- on the one hand, between the axis $Y_{32}$ of the flow and connection path $P_{32}$ of the row 3 crown $F_3$ closest to the periphery $1_1$ of the support 1 and the axis $X_{22}$ of the adjacent channel $C_{22}$ of the crown $F_2$ of lower row 2, and, on the other hand, between the axis $X_{22}$ of the channel $C_{22}$ and the axis $Y_{11}$ of the adjacent flow and connection path $P_{11}$ of the crown $F_1$ of lower row 1, and
- on the one hand, between the axis $Y_{35}$ of the flow and connection path $P_{35}$ of the row 3 crown $F_3$ and the axis $X_{24}$ of the adjacent channel $C_{24}$ of the crown $F_2$ of lower row 2, and, on the other hand, between the axis $X_{24}$ of the channel $C_{24}$ and the axis $Y_{12}$ of the adjacent flow and connection path $P_{12}$ of the crown $F_1$ of lower row 1, and
- on the one hand, between the axis $Y_{38}$ of the flow and connection path $P_{38}$ of the row 3 crown $F_3$ and the axis $X_{26}$ of the adjacent channel $C_{26}$ of the crown $F_2$ of lower row 2, and, on the other hand, between the axis $X_{26}$ of the channel $C_{26}$ and the axis $Y_{13}$ of the adjacent flow and connection path $P_{13}$ of the crown $F_1$ of lower row 1, and
- on the one hand, between the axis $Y_{311}$ of the flow and connection path $P_{311}$ of the row 3 crown $F_3$ and the axis $X_{28}$ of the adjacent channel $C_{28}$ of the crown $F_2$ of lower row 2, and, on the other hand, between the axis $X_{28}$ of the channel $C_{28}$ and the axis $Y_{14}$ of the adjacent flow and connection path $P_{14}$ of the crown $F_1$ of lower row 1, and
- on the one hand, between the axis $Y_{314}$ of the flow and connection path $P_{314}$ of the row 3 crown $F_3$ and the axis $X_{210}$ of the adjacent channel $C_{210}$ of the crown $F_2$ of lower row 2, and, on the other hand, between the axis $X_{210}$ of the channel $C_{210}$ and the axis $Y_{15}$ of the adjacent flow and connection path $P_{15}$ of the crown $F_1$ of lower row 1, and
- on the one hand, between the axis $Y_{317}$ of the flow and connection path $P_{317}$ of the row 3 crown $F_3$ and the axis $X_{212}$ of the adjacent channel $C_{212}$ of the crown $F_2$ of lower row 2, and, on the other hand, between the axis $X_{212}$ of the channel $C_{212}$ and the axis $Y_{16}$ of the adjacent flow and connection path $P_{16}$ of the crown $F_1$ of lower row 1, and
- on the one hand, between the axis $Y_{320}$ of the flow and connection path $P_{320}$ of the row 3 crown $F_3$ and the axis $X_{214}$ of the adjacent channel $C_{214}$ of the crown $F_2$ of lower row 2, and, on the other hand, between the axis $X_{214}$ of the channel $C_{214}$ and the axis $Y_{17}$ of the adjacent flow and connection path $P_{17}$ of the crown $F_1$ of lower row 1, and
- on the one hand, between the axis $Y_{323}$ of the flow and connection path $P_{323}$ of the row 3 crown $F_3$ and the axis $X_{216}$ of the adjacent channel $C_{216}$ of the crown $F_2$ of lower row 2, and, on the other hand, between the axis $X_{216}$ of the channel $C_{216}$ and the axis $Y_{18}$ of the adjacent flow and connection path $P_{18}$ of the crown $F_1$ of lower row 1.

It should also be noted that the transverse cross section represented in FIG. 1A has 4 axes of symmetry.

In the example illustrated, there is also alignment between the adjacent axes X of various channels of crowns 1, 2 and 3, on 8 occasions (at channels $C_{11}$, $C_{21}$ and $C_{31}$; channels $C_{12}$, $C_{23}$ and $C_{34}$; channels $C_{13}$, $C_{25}$ and $C_{37}$; channels $C_{14}$, $C_{27}$ and $C_{310}$; channels $C_{15}$, $C_{29}$ and $C_{313}$; channels $C_{16}$, $C_{211}$ and $C_{316}$; channels $C_{17}$, $C_{213}$ and $C_{319}$ and channels $C_{19}$, $C_{215}$ and $C_{322}$).

Figure 1B:
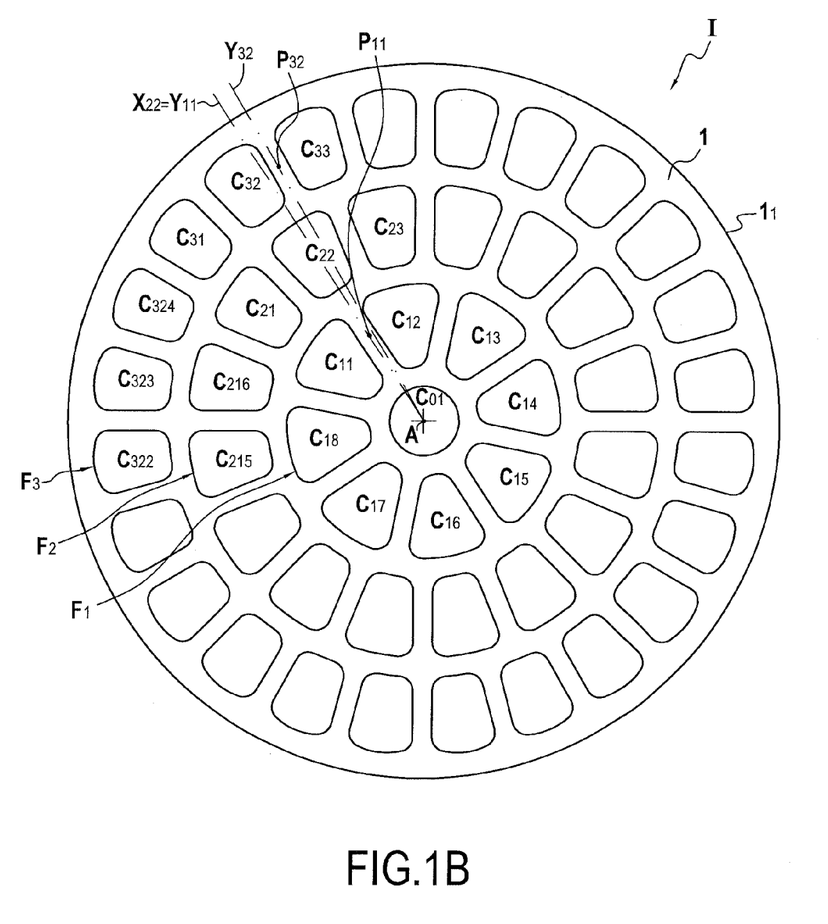
FIG. 1B is a cross-sectional view of a filtration element, given by way of comparison, similar to that from FIG. 1A, but in which the row n crown has been shifted by a rotation of 3.75° about the longitudinal axis of the support.
Figure 1C:
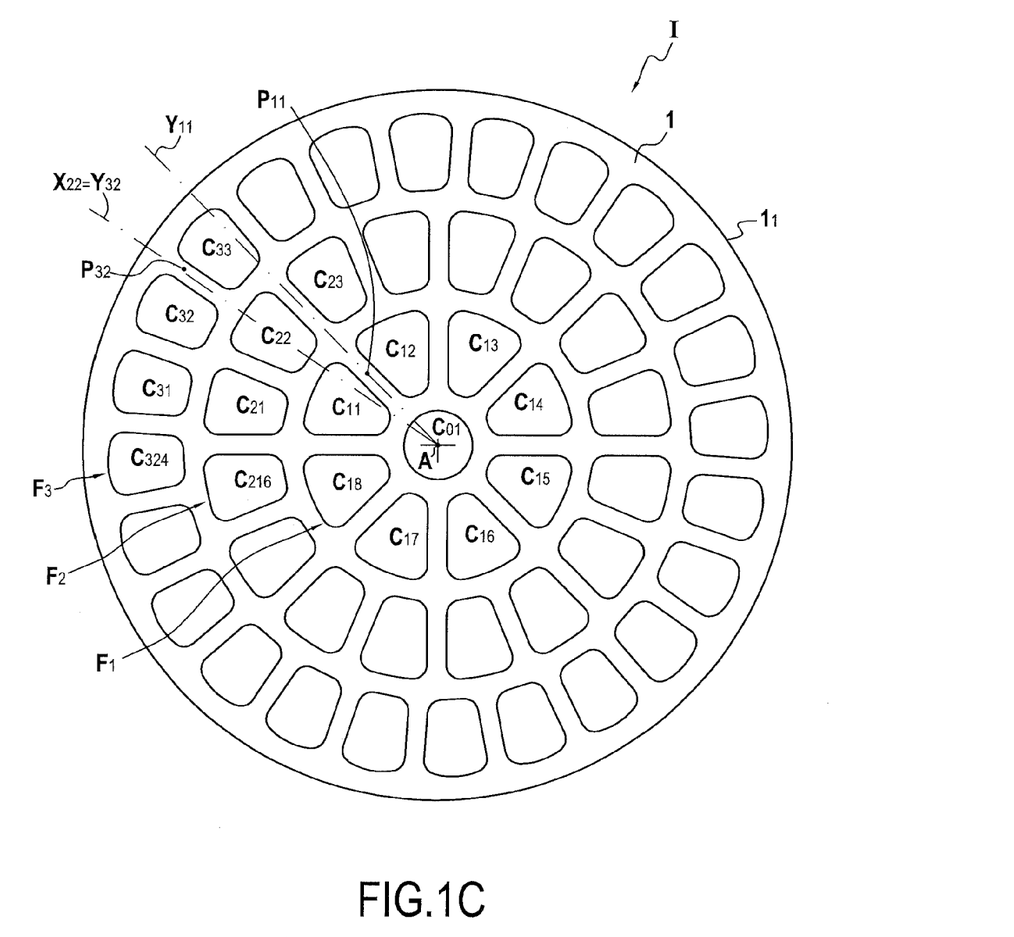
FIG. 1C is a cross-sectional view of a filtration element, given by way of comparison, similar to that from FIG. 1A, but in which the row n−2 crown has been shifted by a rotation of 11.25° about the longitudinal axis of the support.

In order to demonstrate the contribution of the invention, a study was carried out with Abaqus software in order to evaluate the stress field that exists within the support, when a stress corresponding to a pressure of 100 MPa is imposed in each of the channels. It is important to note that the distribution of the stresses is strictly the same, whatever internal force is applied. The conclusions drawn from its calculations are therefore strictly independent of the internal pressure value used. A support in accordance with FIG. 1A was compared with supports in accordance with FIGS. 1B and 1C produced by way of comparison. FIGS. 1B and 1C are identical in every respect to FIG. 1A, except that a rotation of a given angle with respect to the longitudinal axis A has been applied, either to the row 3 crown, or to the row 1 crown. In FIG. 1B, the row 3 crown has been shifted by a rotation of 3.75° about the longitudinal axis A of the support, whereas in FIG. 1C it is the row 1 crown that has been shifted by a rotation of 11.25° about the longitudinal axis A of the support. Indeed, in FIG. 1B, whereas the axes $Y_{32}$, $X_{22}$ and $Y_{11}$ were aligned in FIG. 1A, the axes $X_{22}$ and $Y_{11}$ are still aligned but are shifted by 3.75° with respect to the axis $Y_{32}$. Similarly, in FIG. 1C, the axes $X_{22}$ and $Y_{32}$ are still aligned but are shifted by 11.25° with respect to the axis $Y_{11}$. The maximum stress calculated for FIG. 1A is 71.5 MPa, versus 77.4 MPa and 80.7 MPa respectively for FIGS. 1B and 1C. It therefore appears that the new arrangement of the channels in the crowns of rows n to n−2 (corresponding to rows 3 to 1 in FIGS. 1A to 1C) in accordance with the invention significantly reduces the local zones of weakness. The stresses observed are linked to the pressure exerted by the fluid inside the channels, in particular in the case of fluid hammer. This internal pressure tends to deform and therefore to stress the material. The geometric configuration according to the invention makes it possible to obtain a more balanced distribution of the stresses within the cross section of the support. The fact, for example, of finding over the cross section m times the optimal configuration, at a regular angle interval, is in step with this balancing which limits the shearing effects. The more unbalanced a configuration, the more there is a combination of zones of high rigidity (where all the radial dividers would be aligned) with zones of low rigidities (no alignment) and therefore of high deformations, which leads to a greater shearing effect between these two zones.

Figure 2:
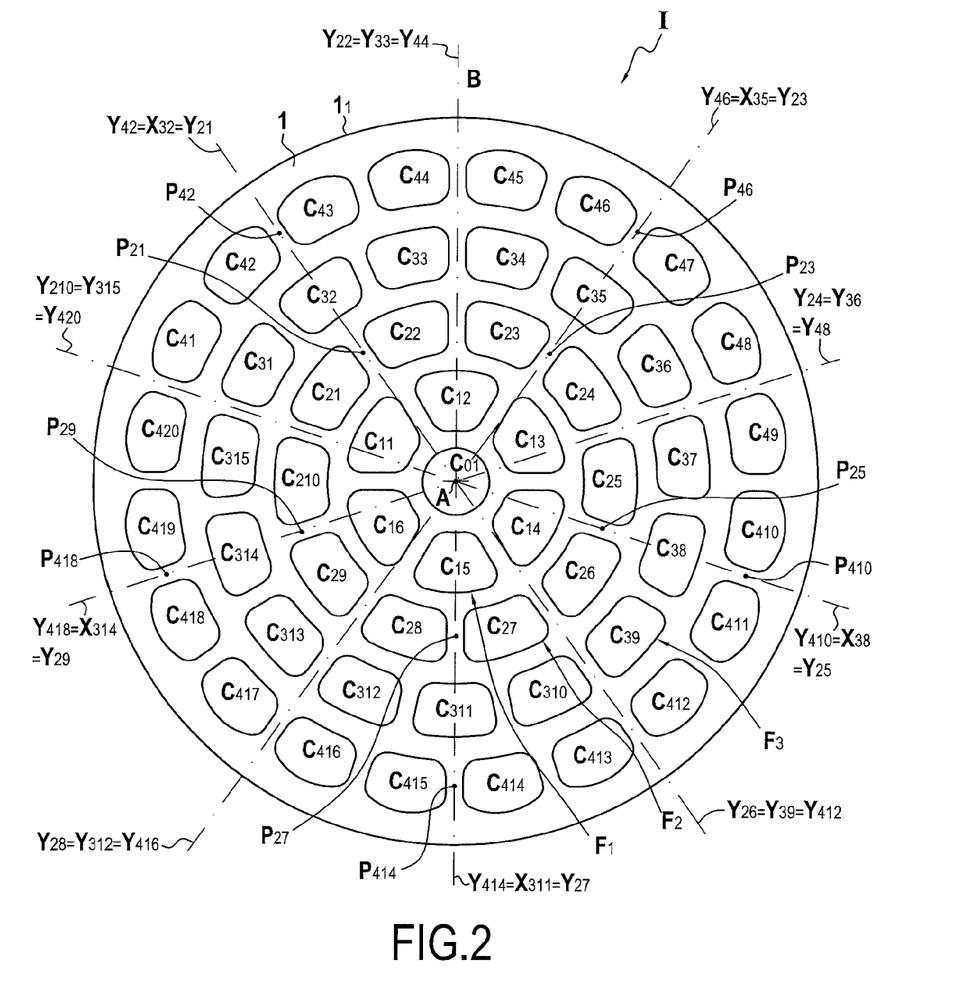
FIG. 2 is a cross-sectional view, deliberately on a larger scale, of another exemplary embodiment of a filtration element in accordance with the invention.

FIG. 2 illustrates another exemplary embodiment of the invention in which the support 1 comprises 4 filtration crowns $F_1$ to $F_4$. Here too, the support also comprises a central channel $C_{01}$ of circular shape in the example illustrated, about which the filtration crowns $F_1$ to $F_4$ are distributed concentrically. These filtration zones are distributed as follows on moving from the central axis A toward the periphery $1_1$ of the support 1:

the row 1 filtration crown $F_1$ consists of 6 identical channels $C_{11}$ to $C_{16}$ of trapezoidal shape,
the row 2 filtration crown $F_2$ consists of 10 identical channels $C_{21}$ to $C_{210}$ of trapezoidal shape,
the row 3 filtration crown $F_3$ consists of 15 identical channels $C_{31}$ to $C_{315}$ of trapezoidal shape, and
the row 4 filtration crown $F_4$ consists of 20 identical channels $C_{41}$ to $C_{420}$ of trapezoidal shape.

According to a precise embodiment, the outer diameter of the support could be 25 mm, and the mean hydraulic diameters over the crowns of rows 1, 2, 3 and 4, could be 2.30-2.32-2.31-2.28 respectively and 2.30 mm for the central channel $C_{01}$. There is therefore also a small variability of the hydraulic diameters from one crown to the next. The same is true for the transverse cross-sectional surface areas. The mean transverse cross-sectional surface areas (corresponding to the arithmetic mean of all the transverse cross-sectional surface areas of the channels of a crown) over the crowns of rows 1, 2, 3 and 4, are 4.6-4.8-4.7-4.5 respectively and 4.2 mm² for the central channel $C_{01}$.

In FIG. 2, the crowns of rows n to n−2 correspond to the crowns of rows 4 to 42. In this implementation example, an exact double superimposition of axes in accordance with the essential feature of the invention is observed, on 5 occasions, over a transverse cross section of the support. The number of channels present over each of the crowns $F_2$ to $F_4$ is a multiple of this number 5. On the other hand, the number of channels present over each of the crowns $F_2$ to $F_4$ (respectively 10, 15 and 20) is not a multiple of 6 corresponding to the number of channels of the crown $F_1$ closest to the center of the support.

There is strict alignment:
on the one hand, between the axis $Y_{42}$ of the flow and connection path $P_{42}$ of the row 4 crown $F_4$ closest to the periphery $1_1$ of the support 1 and the axis $X_{32}$ of the adjacent channel $C_{32}$ of the crown $F_3$ of lower row 3, and, on the other hand, between the axis $X_{32}$ of the channel $C_{32}$ and the axis $Y_{21}$ of the adjacent flow and connection path $P_{21}$ of the crown $F_2$ of lower row 2, and
on the one hand, between the axis $Y_{46}$ of the flow and connection path $P_{46}$ of the row 4 crown $F_4$ and the axis $X_{35}$ of the adjacent channel $C_{35}$ of the crown $F_3$ of lower row 3, and, on the other hand, between the axis $X_{35}$ of the channel $C_{35}$ and the axis $Y_{23}$ of the adjacent flow and connection path $P_{23}$ of the crown $F_2$ of lower row 2, and
on the one hand, between the axis $Y_{410}$ of the flow and connection path $P_{410}$ of the row 4 crown $F_4$ and the axis $X_{38}$ of the adjacent channel $C_{38}$ of the crown $F_3$ of lower row 3, and, on the other hand, between the axis $X_{38}$ of the channel $C_{38}$ and the axis $Y_{25}$ of the adjacent flow and connection path $P_{25}$ of the crown $F_2$ of lower row 2, and
on the one hand, between the axis $Y_{414}$ of the flow and connection path $P_{414}$ of the row 4 crown $F_4$ and the axis $X_{311}$ of the adjacent channel $C_{311}$ of the crown $F_3$ of lower row 3, and, on the other hand, between the axis $X_{311}$ of the channel $C_{311}$ and the axis $Y_{27}$ of the adjacent flow and connection path $P_{27}$ of the crown $F_2$ of lower row 2, and
on the one hand, between the axis $Y_{418}$ of the flow and connection path $P_{418}$ of the row 4 crown $F_4$ and the axis $X_{314}$ of the adjacent channel $C_{314}$ of the crown $F_3$ of lower row 3, and, on the other hand, between the axis $X_{314}$ of the channel $C_{314}$ and the axis $Y_{29}$ of the adjacent flow and connection path $P_{29}$ of the crown $F_2$ of lower row 2.

It should also be noted that the transverse cross section of the support 1 represented in FIG. 2 has an axis of symmetry B.

In the example illustrated, there is also alignment between the adjacent axes Y of various flow and transport paths of crowns 2, 3 and 4, on 5 occasions (at axes $Y_{22}$, $Y_{33}$ and $Y_{44}$; axes $Y_{24}$, $Y_{36}$ and $Y_{48}$; axes $Y_{26}$, $Y_{39}$ and $Y_{412}$; axes $Y_{28}$, $Y_{312}$ and $Y_{416}$; and axes $Y_{210}$, $Y_{315}$ and $Y_{420}$).

Figure 3A:
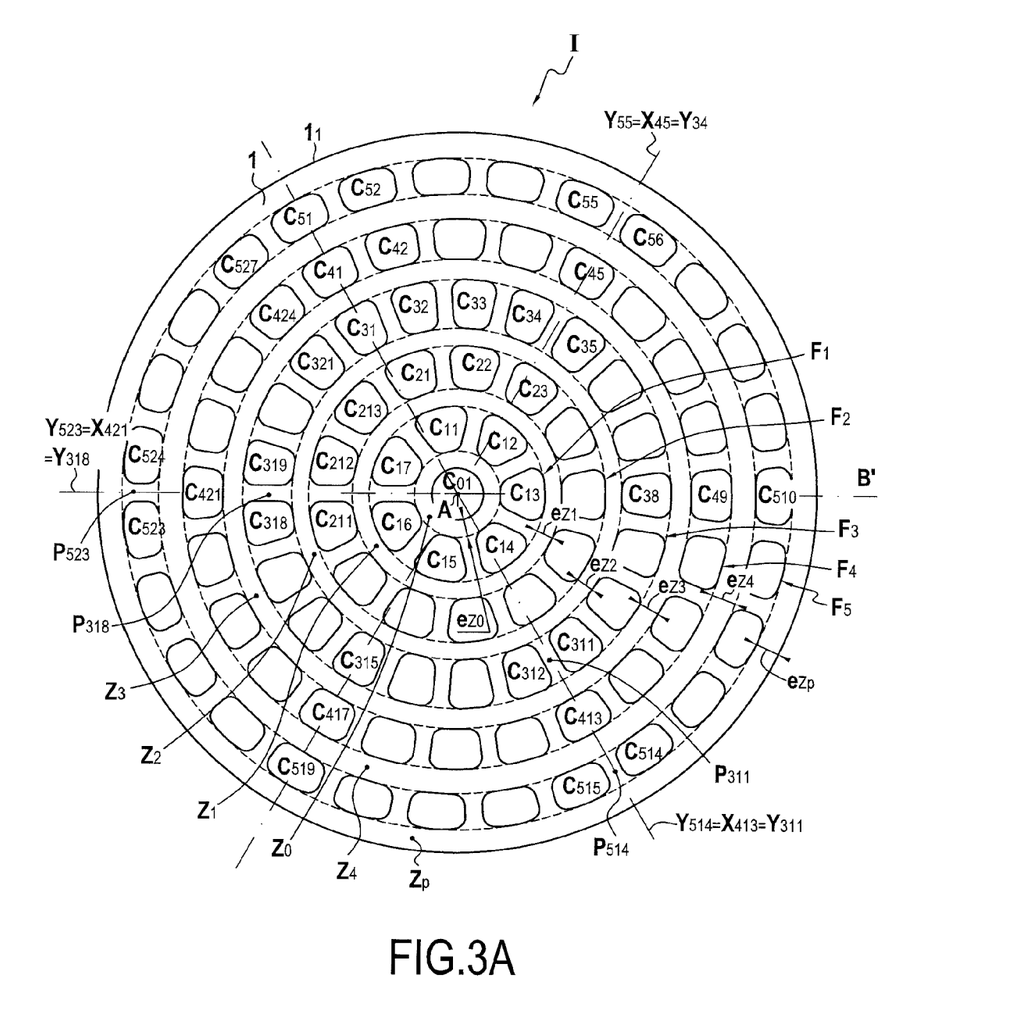
FIG. 3A is a cross-sectional view, deliberately on a larger scale, of another exemplary embodiment of a filtration element in accordance with the invention.

FIG. 3A illustrates another exemplary embodiment of the invention in which the support comprises five filtration crowns $F_1$ to $F_5$ and a central channel $C_{01}$ of circular shape, although here too a shape of polygonal or other type could also be provided. The central channel is separated from the filtration crown of row 1, by a porous zone $Z_0$. The filtration crowns $F_1$ and $F_2$ are separated by a porous zone $Z_1$, the filtration crowns $F_2$ and $F_3$ are separated by a porous zone $Z_2$, the filtration crowns $F_3$ and $F_4$ are separated by a porous zone $Z_3$ and the filtration crowns $F_4$ and $F_5$ are separated by a porous zone $Z_4$. The filtration crowns $F_1$ to $F_5$, which are concentric with respect to the central channel $C_{01}$, are distributed as follows on moving from the central axis A toward the periphery $\mathbf{1}_1$ of the support:

the row 1 filtration crown $F_1$ consists of 7 identical channels $C_{11}$ to $C_{17}$ of trapezoidal shape, the row 2 filtration crown $F_2$ consists of 13 identical channels $C_{21}$ to $C_{213}$ of trapezoidal shape, the row 3 filtration crown $F_3$ consists of 21 identical channels $C_{31}$ to $C_{321}$ of trapezoidal shape, the row 4 filtration crown $F_4$ consists of 24 identical channels $C_{41}$ to $C_{424}$ of trapezoidal shape, and the row 5 filtration crown $F_5$ consists of 27 identical channels $C_{51}$ to $C_{527}$ of trapezoidal shape.

According to a precise embodiment, the outer diameter of the support could be 25 mm, and the mean hydraulic diameters over the crowns of rows 1, 2, 3, 4 and 5 could be 1.57-1.60-1.60-1.62-1.62 respectively and 1.80 mm for the central channel $C_{01}$. There is therefore also a small variability of the hydraulic diameters from one crown to the next. The same is true for the transverse cross-sectional surface areas. The mean transverse cross-sectional surface areas (corresponding to the arithmetic mean of all the transverse cross-sectional surface areas of the channels of a crown) over the crowns of rows 1, 2, 3, 4 and 5 are 2.1-2.1-2.2-2.2-2.3 respectively and 2.5 mm² for the central channel $C_{01}$.

In FIG. 3A, the crowns of rows n to n−2 correspond to the crowns of rows 5 to 3. In this implementation example, an exact double superimposition of axes in accordance with the essential feature of the invention is observed, on 3 occasions, over a transverse cross section of the support. The number of channels present over each of the crowns $F_3$ to $F_5$ is a multiple of this number 3. On the other hand, the number of channels present over the crowns $F_4$ to $F_5$ (respectively 24 and 27) is not a multiple of 7 corresponding to the number of channels of the crown $F_1$ closest to the center of the support.

There is strict alignment:

on the one hand, between the axis $Y_{55}$ of the flow and connection path $P_{55}$ of the row 5 crown $F_5$ closest to the periphery $\mathbf{1}_1$ of the support 1 and the axis $X_{45}$ of the adjacent channel $C_{45}$ of the crown $F_4$ of lower row 4, and, on the other hand, between the axis $X_{45}$ of the channel $C_{45}$ and the axis $Y_{34}$ of the adjacent flow and connection path $P_{34}$ of the crown $F_3$ of lower row 3, and on the one hand, between the axis $Y_{514}$ of the flow and connection path $P_{514}$ of the row 5 crown $F_5$ and the axis $X_{413}$ of the adjacent channel $C_{413}$ of the crown $F_4$ of lower row 4, and, on the other hand, between the axis $X_{413}$ of the channel $C_{413}$ and the axis $Y_{311}$ of the adjacent flow and connection path $P_{311}$ of the crown $F_3$ of lower row 3, and on the one hand, between the axis $Y_{523}$ of the flow and connection path $P_{523}$ of the row 5 crown $F_5$ and the axis $X_{421}$ of the adjacent channel $C_{421}$ of the crown $F_4$ of lower row 4, and, on the other hand, between the axis $X_{421}$ of the channel $C_{421}$ and the axis $Y_{318}$ of the adjacent flow and connection path $P_{318}$ of the crown $F_3$ of lower row 3.

It should also be noted that the transverse cross section of the support represented in FIG. 3A has an axis of symmetry B'. At this axis of symmetry B' which coincides with the axes $Y_{523}$, $X_{421}$ and $Y_{318}$, there is also perfect alignment between the axis of the path separating the channels $C_{212}$ and $C_{211}$ of the row 2 crown and the axis $X_{318}$ of the path separating the channels $C_{318}$ and $C_{319}$ of the crown of higher row 3, which axis is itself aligned with the axes $Y_{523}$ and $X_{421}$.

In the example illustrated, there is also alignment between the adjacent axes X of various channels of crowns 3, 4 and 5, on 3 occasions (at channels $C_{31}$, $C_{41}$ and $C_{51}$; channels $C_{38}$, $C_{49}$ and $C_{510}$ and channels $C_{315}$, $C_{417}$ and $C_{519}$).

Furthermore, in the example illustrated in FIG. 3A, the thickness of each of the filtration zones $Z_0$ to $Z_4$ and of the peripheral zone Zp are not all identical. In the example illustrated, for each of the filtration zones, the centripetal points (i.e. the points closest to the center A) of each channel of one and the same filtration crown are located over a circle, the center of which is the center of the support, this circle corresponding to the inner envelope of the filtration crown in question. Similarly, for each of the filtration zones, the centrifugal points (i.e. the points closest to the periphery $\mathbf{1}_1$ of the support) of each channel of one and the same filtration crown are located over a circle, the center of which is the center of the support, this circle corresponding to the outer envelope of the filtration crown in question. Thus, the outer envelope and inner envelope delimiting each porous zone are two concentric circles and each porous zone is therefore of constant thickness. The distance (corresponding to the thickness $e_{z0}$ of the porous zone $Z_0$) separating the channel central $C_{01}$ from the neighboring filtration crown, namely the filtration crown $F_1$, is smaller than the distance (corresponding to the thickness $e_{z4}$ of the porous zone $Z_4$) separating the last filtration crown $F_5$ from the neighboring filtration crown in the direction of the center of the support, namely the fourth filtration crown $F_4$. This increase in the thickness of at least some of the porous zones on moving away from the central axis of the support is carried out in order to minimize the effect of the pressure exerted by the retentate, or by hydraulic accidents caused by the operation of the installation such as fluid hammers. For this, in the example illustrated, starting from the third porous zone $Z_2$, if two successive porous zones are considered, the ratio between the mean thickness of the outermost porous zone to the mean thickness of the closest porous zone, on moving toward the center of the support, is always greater than 1. In the example illustrated in FIG. 3A, the porous zones $Z_0$, $Z_1$ and $Z_2$ have an identical thickness. Starting from the porous zone $Z_2$, the mean thickness of the filtration zones increases on moving toward the periphery $\mathbf{1}_1$ of the support. The $e_{z3}/e_{z2}$ and $e_{z4}/e_{z3}$ thickness ratios are between 1.14 and 1.17.

So as to further reinforce the mechanical strength of the filtration element, it is possible to make provision, as in the example illustrated in FIG. 3A, for the peripheral zone Zp separating the last filtration crowns $F_5$ from the outer surface $\mathbf{1}_1$ of the support 1 to also be greater than the mean thickness of the porous zone $Z_4$. Nevertheless, according to one variant that is not preferred, provision could also be made for this peripheral porous zone Zp to have a thickness identical to the thickness of the porous zone $Z_4$. In the example illustrated in FIG. 3A, the mean thickness of the peripheral zone Zp corresponds to around 1.13× the mean thickness of the porous zone $Z_4$.

Figure 3B:
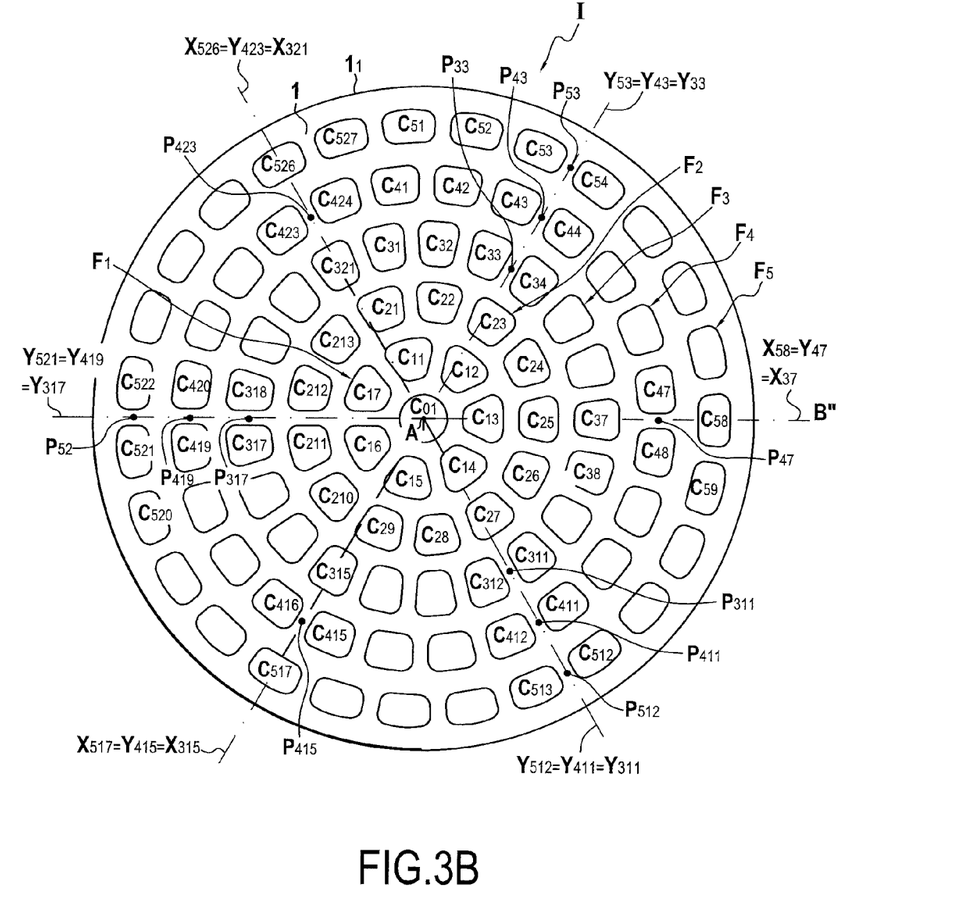
FIG. 3B is a cross-sectional view of a filtration element similar to that from FIG. 3A, but in which the row n−1 crown has been shifted by a rotation of 7.5° about the longitudinal axis of the support.

FIG. 3B is identical in every respect to FIG. 3A, except that a rotation of an angle of 7.5° with respect to the longitudinal axis A has been applied to the row 4 crown. FIG. 3B illustrates another embodiment of the invention in which there is alignment between at least one axis X of a channel of the row 5 crown, an axis Y of an adjacent flow and connection path of the crown of lower row 4 and the axis of an adjacent channel X of the crown of lower row 3. Indeed, in the example illustrated, there is strict alignment:

- between the axis $X_{526}$ of the channel $C_{526}$ of the row 5 crown $F_5$ closest to the periphery $1_1$ of the support 1, the axis $Y_{423}$ of the adjacent flow and connection path $P_{423}$ adjacent of the crown $F_4$ of lower row 4, and the axis $X_{321}$ of the channel $C_{321}$ of the crown $F_3$ of lower row 3, and
- between the axis $X_{58}$ of the channel $C_{58}$ of the crown $F_5$ of row 5, the axis $Y_{47}$ of the adjacent flow and connection path $P_{47}$ of the crown $F_4$ of lower row 4, and the axis $X_{37}$ of the channel $C_{37}$ of the crown $F_3$ of lower row 3, and
- between the axis $X_{517}$ of the channel $C_{517}$ of the crown $F_5$ of row 5, the axis $Y_{415}$ of the adjacent flow and connection path $P_{415}$ of the crown $F_4$ of lower row 4, and the axis $X_{314}$ of the channel $C_{314}$ of the crown $F_3$ of lower row 3.

In the example illustrated, there is also alignment between the adjacent axes Y of various flow and connection paths P of crowns 3, 4 and 5: at the paths $P_{317}$, $P_{419}$ and $P_{521}$ the axes $Y_{317}$, $Y_{419}$ and $Y_{521}$ are aligned. There is also alignment of the axes $Y_{53}$, $Y_{43}$, $Y_{33}$ at the paths $P_{53}$, $P_{43}$ and $P_{33}$, and also of the axes $Y_{512}$, $Y_{411}$ and $Y_{311}$ at the paths $P_{512}$, $P_{411}$ and $P_{311}$. The transverse cross section of the support 1 also has an axis of symmetry B".

A study was carried out with Abaqus software in order to evaluate the stress fields that exist within the support, when a stress corresponding to a pressure of 100 MPa is imposed in each of the channels. The maximum stress calculated for FIG. 3A is 56.1 MPa, and 56.2 MPa for FIG. 3B.

Within the context of the invention, as illustrated in FIGS. 1A, 2, 3A and 3B, the filtration zones may correspond exclusively to a single central channel $C_{01}$ and to crowns of channels as defined within the context of the invention and distributed concentrically with respect to the central axis of the support. Nevertheless, various variations may be provided. In particular, the single central channel may be eliminated or replaced by a set of channels arranged as petals starting from the central axis A of the support 1. Or alternatively, when the support comprises more than three filtration crowns, provision may be made for the three crowns closest to the periphery of the support not to be overlapped whereas the others closer to the center of the support are overlapped. Provision may also be made for all the crowns present not to be overlapped, as in the examples illustrated.

Advantageously, provision will be made, for all the channels, including the central channel, irrespective of the two channels taken in pairs, for the ratio between their hydraulic diameters to be within the interval 0.75-1.25, or even within the interval 0.95-1.05 and/or for the ratio between their transverse cross-sectional surface areas to be within the interval 0.75-1.25, or even within the interval 0.95-1.05.

Similarly, within the context of the invention, as illustrated in FIGS. 1A, 2, 3A and 3B, the channels of the various crowns are advantageously arranged at regular and identical intervals over their respective crown, but other configurations could also be provided. Furthermore, it'll be noted that when all the channels are identical within one and the same crown, which is the case in FIGS. 1A, 2, 3A and 3B, they are all positioned in an identical manner over the crown, taking into account the requirements in terms of symmetry of the channels and of the flow and connection paths.

According to another feature illustrated in the various exemplary embodiments of the invention, the flow dividers P have, preferably, within one and the same crown, substantially identical thicknesses. According to one embodiment, in particular illustrated in FIGS. 1A, 2, 3A and 3B, provision is made for the width of the flow paths P made between two neighboring channels of a crown to be constant over their entire length. This width is also identical from one filtration crown to the next. Indeed, the applicant has observed that the width variations of the paths for transporting the permeate, as described in patent applications WO 93 07959 in the name of CERASIV and EP 0 780 148 in the name of CORNING, inevitably reveal points of small width which systematically constitute points of weakness with regard to the mechanical stresses undergone by the filtration element. The use of paths for transporting the permeate toward the periphery that are of constant width makes it possible to optimize the mechanical characteristics of the filtration element. Indeed, if a transport path of constant width and a transport path having a width that increases from the center toward the periphery of the support are compared, while keeping the cross section and the number of channels which define these paths constant, the smallest width of the variable-width path is smaller than the width of the constant-width path and this point of smaller width thus becomes a point of mechanical weakness. The choice of a flow path of constant thickness also makes it possible to obtain a better manufacturing efficiency since the extrusion pressures are more uniform.

The width of a flow path can be defined in the following manner: within each crown, the channels have noncircular cross sections. In the examples illustrated, the channels of the crowns are of trapezoidal shape. They have one wall that faces the periphery $1_1$ of the support (referred to as the outer wall), one wall that faces the center A of the support (referred to as the inner wall), and two side walls connect the inner wall and the outer wall. Usually, the side walls are connected to the inner and outer walls by fillets. In certain cases, the inner wall could be replaced by a fillet connecting the two side walls R. A radial wall consists of a straight line segment connected by fillets to the inner and outer walls of the channel that it delimits. The width of a flow path is understood to be the width of the path over the part corresponding to these straight line segments which is located between the fillets.

The invention claimed is:
1. A filtration element (I) for filtering a fluid medium comprising a rigid porous support (1) of cylindrical shape having a longitudinal central axis (A) and comprising a plurality of channels ($C_{01}$, $C_{11}$, $C_{12}$ ... $C_{21}$, $C_{22}$ ... $C_{n1}$, $C_{n2}$ ...) for the circulation of the fluid medium to be filtered with a view to recovering a filtrate at the periphery ($1_1$) of the support (1), which channels are made in the support (1) parallel to its central axis (A), said channels ($C_{01}$, $C_{11}$, $C_{12}$ ... $C_{21}$, $C_{22}$ ... $C_{n1}$, $C_{n2}$ ...) defining filtration crowns ($F_1$, $F_2$ ... $F_n$), each crown constituting a filtration zone defined as a set of identical channels located over a circle, filtration crowns being distributed on concentric circles, of at least three in number, in each of which:
    the channels ($C_{11}$, $C_{12}$ ... $C_{21}$, $C_{22}$ ... $C_{n1}$, $C_{n2}$ ...) have a noncircular transverse cross section, the transverse cross section of each channel having an axis of symmetry (X, $X_1$ ... $X_n$, $X_{11}$, ... $X_{21}$ ..., $X_{n1}$ ...) that passes through a center of the support,
    two neighboring channels are separated by flow and connection paths (P, $P_1$, $P_2$ ... $P_n$, $P_{11}$, ... $P_{21}$ ..., $P_{n1}$ ...), said flow and connection paths (P, $P_1$, $P_2$ ... $P_n$, $P_{11}$, ... $P_{21}$ ..., $P_{n1}$ ...) having an axis of symmetry (Y, $Y_1$, $Y_2$ ... $Y_n$, $Y_{11}$, ... $Y_{21}$ ..., $Y_{n1}$ ... ) that passes through the center of the support, the ratios between the hydraulic diameters of any two channels ($C_{11}$, $C_{12}$ ... $C_{21}$, $C_{22}$ ... $C_{n1}$, $C_{n2}$ ... ) of the filtration crowns are all within an interval 0.75-1.25, said filtration crowns ($F_1$, $F_2$ ... $F_n$) being distributed concentrically and separated from one another by a continuous porous zone ($F_1$, $F_2$ ... $F_{n-1}$), without overlap between two adjacent crowns, and at the three crowns closest to the periphery of the support, known as row n, n−1 and n−2 crowns, there is at least a substantial alignment of 3 adjacent axes located on a same side with regard to the center of the support among the axes (Y, $Y_1$, $Y_2$ ... $Y_n$, $Y_{11}$, ... $Y_{21}$ ..., $Y_{n1}$ ... ) of the flow and connection paths and the axes (X, $X_1$ ... $X_n$, $X_{11}$, ... $X_{21}$ ..., $X_{n1}$ ... ) of the channels, which favors mechanical strength of the support, and when the filtration element has more than three filtration crowns, there is at least one crown among the three crowns closest to the periphery of the support, known as row n, n−1 and n−2 crowns, the number of channels of which is not a multiple of the number of channels of the crown closest to the center of the support, known as row 1 crown.

2. The filtration element (I) as claimed in claim 1, characterized in that the substantial alignment between the axes of the flow and connection paths and the axes of the channels which favors mechanical strength of the support corresponds to at least one axis ($Y_n$) of a flow and connection path ($P_n$) of the crown ($F_n$) closest to the periphery ($1_1$) of the support (1), known as row n crown, is substantially aligned with the axis ($X_{n-1}$) of an adjacent channel of the crown ($F_{n-1}$) of lower row n−1, said axis ($X_{n-1}$) of the channel itself being substantially aligned with the axis ($Y_{n-2}$) of an adjacent flow and connection path ($P_{n-2}$) of the crown ($F_{n-2}$) of lower row n−2.

3. The filtration element (I) as claimed in claim 2, characterized in that the axis ($Y_n$) of a flow and connection path ($P_n$) of the crown ($F_n$) closest to the periphery ($1_1$) of the support (1), known as row n crown, is aligned with the axis ($X_{n-1}$) of an adjacent channel of the crown ($F_{n-1}$) of lower row n−1, with a tolerance of ±16% of the value of an angular sector defined by the two axes of symmetry of the flow and connection paths delimiting said channel of the row n−1 crown and said axis ($X_{n-1}$) of the channel is itself substantially aligned with the axis ($Y_{n-2}$) of an adjacent flow and connection path ($P_{n-2}$) of the crown ($F_{n-2}$) of lower row n−2, with a tolerance of ±16% of the value of the angular sector defined by the two axes of symmetry of the flow and connection paths delimiting said channel of the row n−1 crown.

4. The filtration element (I) as claimed in claim 2, characterized in that it comprises at least four filtration crowns ($F_1$, $F_2$, $F_3$, ... $F_n$) and in that for at least one axis ($Y_n$) of a flow and connection path ($P_n$) of the crown ($F_n$) of row n, which is substantially aligned with the axis ($X_{n-1}$) of an adjacent channel of the crown ($F_{n-1}$) of lower row n−1, with said axis of the channel itself substantially aligned with the axis ($Y_{n-2}$) of an adjacent flow and connection path ($P_{n-2}$) of the crown ($F_{n-2}$) of lower row n−2, there is also substantial alignment between said axis ($Y_{n-2}$) of the flow and connection path ($P_{n-2}$) of the crown ($F_{n-2}$) of row n−2 and the axis ($Y_{n-3}$) of the adjacent flow and connection path ($P_{n-3}$) of the crown ($F_{n-3}$) of row n−3.

5. The filtration element (I) as claimed in claim 1, characterized in that the substantial alignment between the axes of the flow and connection paths and the axes of the channels, which favors the mechanical strength of the support, corresponds to the fact that at least one axis ($X_n$) of a channel of the crown ($F_n$) closest to the periphery ($1_1$) of the support (1), known as row n crown, is substantially aligned with the axis ($Y_{n-1}$) of an adjacent flow and connection path ($P_{n-1}$) of the crown ($F_{n-1}$) of lower row n−1, said axis ($Y_{n-1}$) of the flow and connection path being itself substantially aligned with the axis ($X_{n-2}$) of an adjacent channel of the crown ($F_{n-2}$) of lower row n−2.

6. The filtration element (I) as claimed in claim 5, characterized in that the axis ($X_n$) of a channel of the crown ($F_n$) closest to the periphery ($1_1$) of the support (1), known as row n crown, is aligned with the axis ($Y_{n-1}$) of an adjacent flow and connection path of the crown ($F_{n-1}$) of lower row n−1, with a tolerance of ±16% of the value of an angular sector defined by the two axes of symmetry of the flow and connection paths delimiting said channel of the row n crown and said axis ($Y_{n-1}$) of the flow and connection path is itself substantially aligned with the axis ($X_{n-2}$) of an adjacent channel of the crown ($F_{n-2}$) of lower row n−2, with a tolerance of ±16% of the value of the angular sector defined by the two axes of symmetry of the flow and connection paths delimiting said channel of the row n−2 crown.

7. The filtration element (I) as claimed in claim 1, characterized in that at least one axis ($Y_n$) of a flow and connection path ($P_n$) of the crown ($F_n$) closest to the periphery of the support, known as row n crown, is substantially aligned with the axis ($Y_{n-1}$) of an adjacent flow and connection path ($P_{n-1}$) of the crown ($F_{n-1}$) of lower row n−1, said axis ($Y_{n-1}$) of the flow and connection path ($P_{n-1}$) itself being substantially aligned with the axis ($Y_{n-2}$) of an adjacent flow and connection path ($P_{n-2}$) of the crown ($F_{n-2}$) of lower row n−2.

8. The filtration element (I) as claimed in claim 7, characterized in that the axis ($Y_n$) of a flow and connection path ($P_n$) of the crown ($F_n$) closest to the periphery ($1_1$) of the support (1), known as row n crown, is aligned with the axis ($Y_{n-1}$) of an adjacent flow and connection path ($P_{n-1}$) of the crown ($F_{n-1}$) of lower row n−1, with a tolerance of ±3°, and said axis ($Y_{n-1}$) of the flow and connection path ($P_{n-1}$) is itself substantially aligned with the axis ($Y_{n-2}$) of an adjacent flow and connection path ($P_{n-2}$) of the crown ($F_{n-2}$) of lower row n−2, with a tolerance of ±3°.

9. The filtration element (I) as claimed in claim 1, characterized in that at least one axis ($X_n$) of a channel of the crown ($F_n$) closest to the periphery of the support, known as row n crown, is substantially aligned with the axis ($X_{n-1}$) of an adjacent channel of the crown ($F_{n-1}$) of lower row n−1, said axis ($X_{n-2}$) of the channel itself being substantially aligned with the axis of an adjacent channel ($X_{n-2}$) of the crown ($F_{n-2}$) of lower row n−2.

10. The filtration element (I) as claimed in claim 9, characterized in that an axis ($X_n$) of a channel of the crown ($F_n$) closest to the periphery ($1_1$) of the support, known as row n crown, is aligned with the axis of an adjacent channel ($X_{n-1}$) of the crown ($F_{n-1}$) of lower row n−1, with a tolerance of ±16% of the value of an angular sector defined by the two axes of symmetry of the flow and connection paths delimiting said channel ($X_{n-1}$) of the row n−1 crown, said axis ($X_{n-1}$) of the channel of the crown ($F_{n-1}$) of lower row n−1 itself being substantially aligned with the axis ($X_{n-2}$) of an adjacent channel of the crown ($F_{n-2}$) of lower row n−2, with a tolerance of ±16% of the value of the angular sector defined by the two axes of symmetry of the flow and connection paths delimiting said channel ($X_{n-1}$) of the row n−1 crown.

11. The filtration element (I) as claimed in claim 1, characterized in that the number of channels per crown is increasing from the row n−2 to n crowns.

12. The filtration element (I) as claimed in claim 1, characterized in that in each of the row n−2 to n crowns all the channels are identical.

13. The filtration element (I) as claimed in claim 1, characterized in that all ratios between the transverse cross-sectional surface areas of any channels belonging to the filtration crowns are all within an interval 0.75-1.25.

14. The filtration element (I) as claimed in claim 1, characterized in that the widths of the flow and connection paths are equal within one and the same crown and are equal from one crown to the next.

15. The filtration element (I) as claimed in claim 1, characterized in that the width of each flow and connection path is constant over its entire length.

16. The filtration element (I) as claimed in claim 1, characterized in that all the channels of the filtration crowns ($F_1, F_2 \ldots F_n$) are delimited by an outer wall, two side walls and fillets and optionally an inner wall, said fillets each having an arc-shaped profile, the radius of which is greater than or equal to 0.3 mm.

17. The filtration element (I) as claimed in claim 1, characterized in that the row n, n−1 and n−2 crowns ($F_n, F_{n-1}, F_{n-2}$) each have a number of channels that is a multiple of an integer m and in that the number of axes ($Y_n$) of a flow and connection path ($P_n$) of the row n crown ($F_n$), which are substantially aligned with the axis ($X_{n-1}$) of an adjacent channel of the crown ($F_{n-1}$) of lower row n−1, with said axis of the channel itself substantially aligned with the axis ($Y_{n-2}$) of an adjacent flow and connection path ($P_{n-2}$) of the crown ($F_{n-2}$) of lower row n−2, corresponds to this integer m.

18. The filtration element (I) as claimed in claim 1, characterized in that the channels ($C_{n1}, C_{n2} \ldots$) of one and the same filtration crown are all identical and are spaced an equal distance apart from one another.

19. The filtration element (I) as claimed in claim 1, characterized in that it comprises a central channel ($C_{01}$) and in that the filtration crowns are distributed concentrically with respect to the central channel ($C_{01}$).

20. The filtration element (I) as claimed in claim 1, characterized in that the filtration crowns ($F_1, F_2 \ldots F_n$) are distributed over concentric circles.

21. The filtration element (I) as claimed in claim 1, characterized in that all the channels ($C_{11}, C_{12} \ldots C_{21}, C_{22} \ldots C_{n1}, C_{n2} \ldots$) of the filtration crowns ($F_1, F_2 \ldots F_n$) have a trapezoidal or triangular cross section.

22. The filtration element (I) as claimed in claim 1, characterized in that the support has a circular or polygonal cross section.

23. The filtration element (I) as claimed in claim 1, characterized in that the surface of all the channels ($C_{01}, C_{11}, C_{12} \ldots C_{21}, C_{22} \ldots C_{n1}, C_{n2} \ldots$) is covered with at least one inorganic filtration layer.

24. The filtration element (I) as claimed in claim 1, characterized in that a mean thickness of the porous zone ($Z_0$) closest to the central axis is less than a mean thickness of the porous zone ($Z_{n-1}$) closest to the periphery of the support and on moving from the central axis (A) of the support toward a periphery thereof, the mean thickness of a porous zone is either identical to the next zone, or smaller.

25. A filtration installation or module comprising a filtration element (I), as claimed in claim 1, in a housing.

* * * * *